(12) United States Patent
Iriyama

(10) Patent No.: US 9,648,244 B2
(45) Date of Patent: May 9, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Yutaka Iriyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 14/800,800

(22) Filed: Jul. 16, 2015

(65) Prior Publication Data

US 2016/0028971 A1    Jan. 28, 2016

(30) Foreign Application Priority Data

Jul. 22, 2014   (JP) .................................. 2014-148612

(51) Int. Cl.
*H04N 5/232* (2006.01)
*G02B 3/04* (2006.01)
*G02B 15/17* (2006.01)

(52) U.S. Cl.
CPC ........... *H04N 5/23296* (2013.01); *G02B 3/04* (2013.01); *G02B 15/17* (2013.01)

(58) Field of Classification Search
CPC ................ H04N 5/23296; G02B 15/17; G02B 3/02–3/08
See application file for complete search history.

(56) References Cited

U.S. PATENT DOCUMENTS

2011/0090373 A1* 4/2011 Wakazono ........... G02B 15/173
                                                                         348/240.1
2012/0134031 A1* 5/2012 Eguchi ................. G02B 15/173
                                                                         359/686

FOREIGN PATENT DOCUMENTS

JP         2011-107693 A      6/2011

* cited by examiner

*Primary Examiner* — Paul Berardesca
(74) *Attorney, Agent, or Firm* — Carter, DeLuca, Farrell & Schmidt, LLP

(57) ABSTRACT

The zoom lens according to the present invention includes, in order from an object side to an image side: a first lens unit having a positive refractive power that does not move for zooming; a second lens unit having a negative refractive power that moves during zooming; a third lens unit having a negative refractive power that moves along a locus convex toward the object side during zooming from a wide angle end to a telephoto end; a fourth lens unit having a positive refractive power that moves during zooming; an aperture stop; and a fifth lens unit having a positive refractive power that does not move for zooming, in which the fourth lens unit has a lens surface having an aspherical shape with which the positive refractive power is weakened.

7 Claims, 7 Drawing Sheets

WIDE ANGLE END

TELEPHOTO END

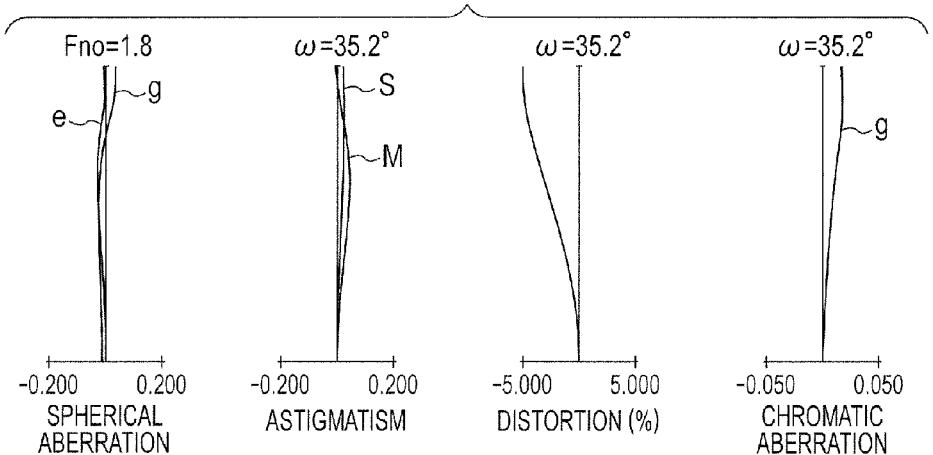
FIG. 2A — WIDE ANGLE END
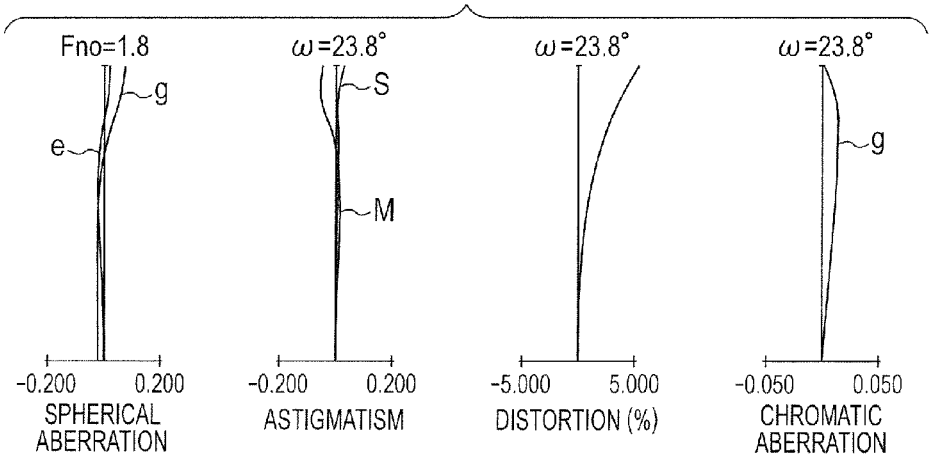
FIG. 2B — FOCAL LENGTH fz=12.5mm
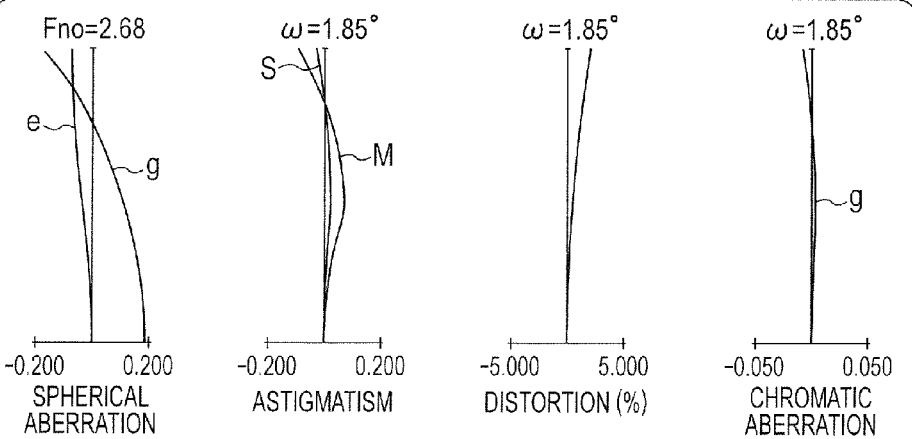
FIG. 2C — TELEPHOTO END

WIDE ANGLE END

FOCAL LENGTH fz

TELEPHOTO END

WIDE ANGLE END

FOCAL LENGTH fz

TELEPHOTO END

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are particularly suitable as an image pickup optical system of image pickup apparatus, such as a broadcasting television camera, a movie camera, a video camera, a digital still camera, and a silver-halide film camera.

Description of the Related Art

In recent years, a zoom lens that is small and lightweight as a whole and has a wide angle of field, a high zoom ratio, and high optical performance has been demanded for an image pickup optical system used for image pickup apparatus. As the zoom lens having the wide angle of field and the high zoom ratio, there has been known a positive-lead type five-unit zoom lens including five lens units as a whole, in which a lens unit having a positive refractive power is arranged closest to an object side. As the five-unit zoom lens, there has been known a zoom lens including, in order from an object side to an image side, a first lens unit having a positive refractive power, a second lens unit having a negative refractive power, a third lens unit having a negative refractive power, a fourth lens unit having a positive refractive power, and a fifth lens unit having a positive refractive power (Japanese Patent Application Laid-Open No. 2011-107693).

In Japanese Patent Application Laid-Open No. 2011-107693, during zooming from a wide angle end to a telephoto end, the second lens unit moves toward the image side, and the third lens unit and the fourth lens unit move along loci convex toward the object side. During zooming, movement loci of the second lens unit and the third lens unit are appropriately set. In this manner, a zoom lens having an imaging field angle at the wide angle end of 35 degrees to 38 degrees and a zoom ratio of 17 to 37 while reducing an effective diameter of the first lens unit and the size of the zoom lens is obtained.

The five-unit zoom lens described above is relatively easy to increase in field angle and zoom ratio. However, in order to obtain high optical performance over the entire zoom range while maintaining the increased field angle and zoom ratio, it becomes important to appropriately set the refractive powers, lens configurations, and the like of the lens units. Moreover, when an aspherical surface is used, it becomes easier to correct various aberrations, but it becomes important to appropriately set a lens unit that uses the aspherical surface, an aspherical amount thereof, and the like.

When those configurations are not appropriately set, it is difficult to provide a small zoom lens having high optical performance over the entire zoom range with a wide angle of field and a high zoom ratio. For example, in the five-unit zoom lens described above, when the lens configuration of the fourth lens unit that moves during zooming, is not appropriately set, aberration variation during zooming, especially coma in the periphery of an image plane, varies significantly, and hence it is difficult to obtain the high optical performance over the entire zoom range.

SUMMARY OF THE INVENTION

It is an object of the present invention to provide a zoom lens having a wide angle of field and a high zoom ratio as well as high optical performance over the entire zoom range, and to provide an image pickup apparatus including the zoom lens.

According to one embodiment of the present invention, there is provided a zoom lens, including, in order from an object side to an image side: a first lens unit having a positive refractive power that does not move for zooming; a second lens unit having a negative refractive power that moves during zooming; a third lens unit having a negative refractive power that moves along a locus convex toward the object side during zooming from a wide angle end to a telephoto end; a fourth lens unit having a positive refractive power that moves during zooming; an aperture stop; and a fifth lens unit having a positive refractive power that does not move for zooming, in which the fourth lens unit has a lens surface having an aspherical shape with which the positive refractive power is weakened.

Further features of the present invention will become apparent from the following description of exemplary embodiments with reference to the attached drawings.

BRIEF DESCRIPTION OF THE DRAWINGS

FIG. 2A is a longitudinal aberration diagram at the wide angle end of the zoom lens of Numerical Example 1.

FIG. 2B is a longitudinal aberration diagram at fz=12.5 mm of the zoom lens of Numerical Example 1.

FIG. 2C is a longitudinal aberration diagram at the telephoto end of the zoom lens of Numerical Example 1.

DESCRIPTION OF THE EMBODIMENTS

In the following, an exemplary embodiment of the present invention is described in detail with reference to the attached drawings. A zoom lens of the present invention includes, in order from an object side to an image side, a first lens unit having a positive refractive power, a second lens unit having a negative refractive power, a third lens unit having a negative refractive power, a fourth lens unit having a positive refractive power, and a fifth lens unit having a positive refractive power.

During zooming, the second lens unit to the fourth lens unit move. More specifically, during zooming from a wide angle end to a telephoto end, the second lens unit moves toward the image side, and the third lens unit moves along a locus convex toward the object side. The fourth lens unit moves non-linearly. Mostly, the second lens unit and the third lens unit perform zooming, and the fourth lens unit corrects an image plane position that varies accompanying the zooming.

Figure 1A:
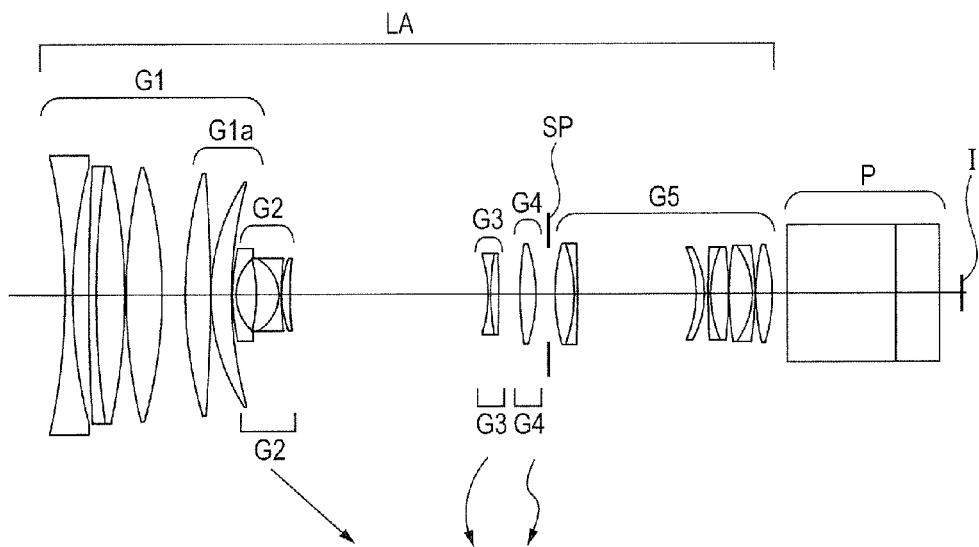
FIG. 1A is a lens cross-sectional view at a wide angle end of a zoom lens of Numerical Example 1.
Figure 1B:
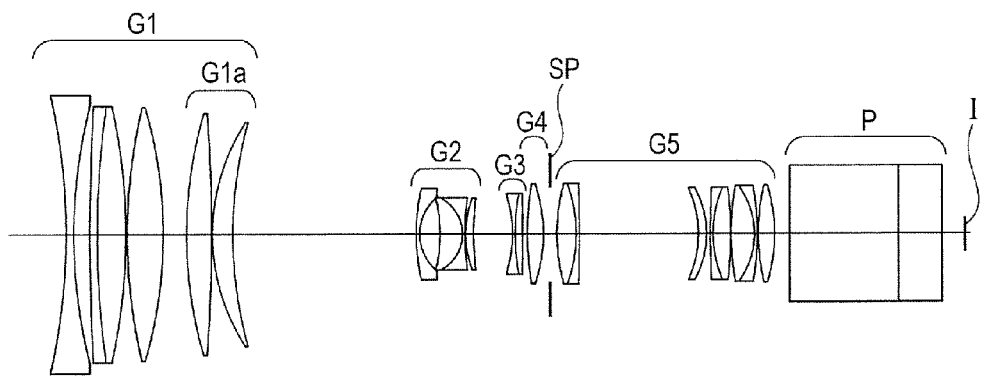
FIG. 1B is a lens cross-sectional view at a telephoto end of the zoom lens of Numerical Example 1.
Figure 3A:
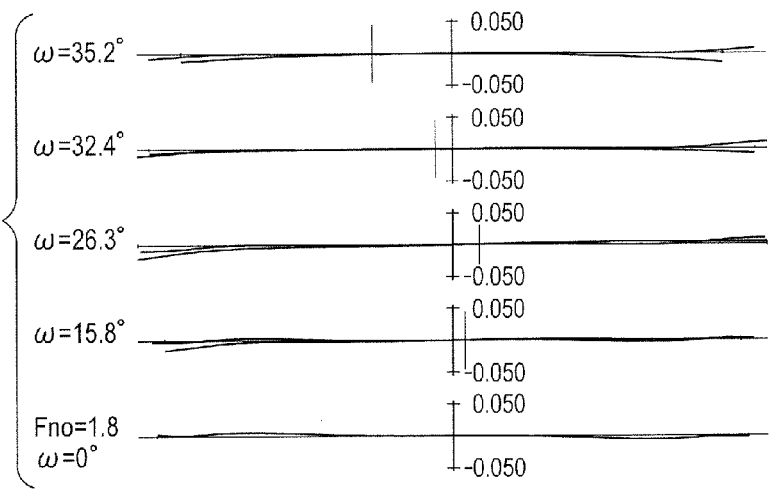
FIG. 3A is a lateral aberration diagram at the wide angle end of the zoom lens of Numerical Example 1.
Figure 3B:
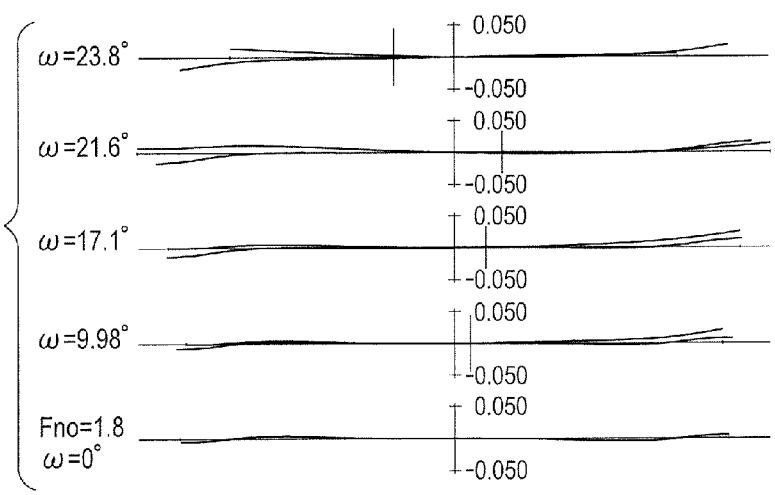
FIG. 3B is a lateral aberration diagram at fz=12.5 mm of the zoom lens of Numerical Example 1.
Figure 3C:
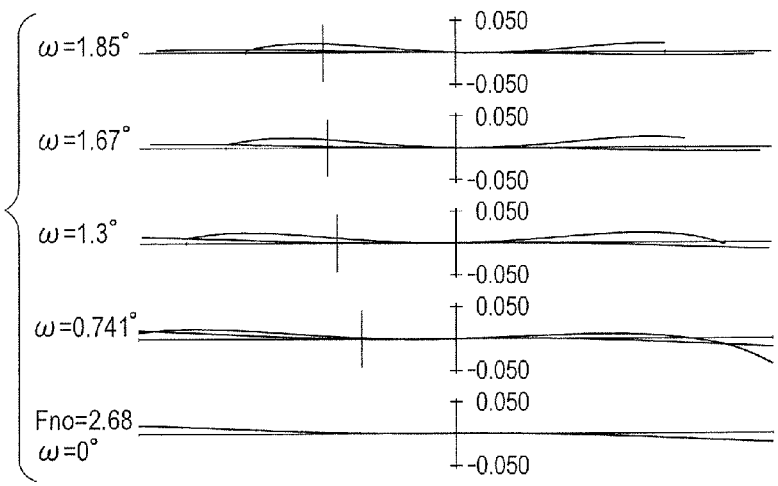
FIG. 3C is a lateral aberration diagram at the telephoto end of the zoom lens of Numerical Example 1.

FIG. 1A and FIG. 1B are lens cross-sectional views at the wide angle end (short focal length end) and the telephoto end (long focal length end) when focus is at an object at infinity of the zoom lens of Example 1 (Numerical Example 1) of the present invention, respectively. FIG. 2A, FIG. 2B, and FIG. 2C are longitudinal aberration diagrams at the wide angle end, a focal length of the zoom lens fz=12.5 mm, and the telephoto end when focus is at the object at infinity of Example 1, respectively. It should be noted, however, that the focal length is a value when each value of Numerical Examples is expressed in units of mm. This applies to all Examples to be described below. FIG. 3A, FIG. 3B, and FIG. 3C are lateral aberration diagrams at the wide angle end, the focal length of the zoom lens fz=12.5 mm, and the telephoto end when focus is at the object at infinity of Example 1, respectively.

Figure 4A:
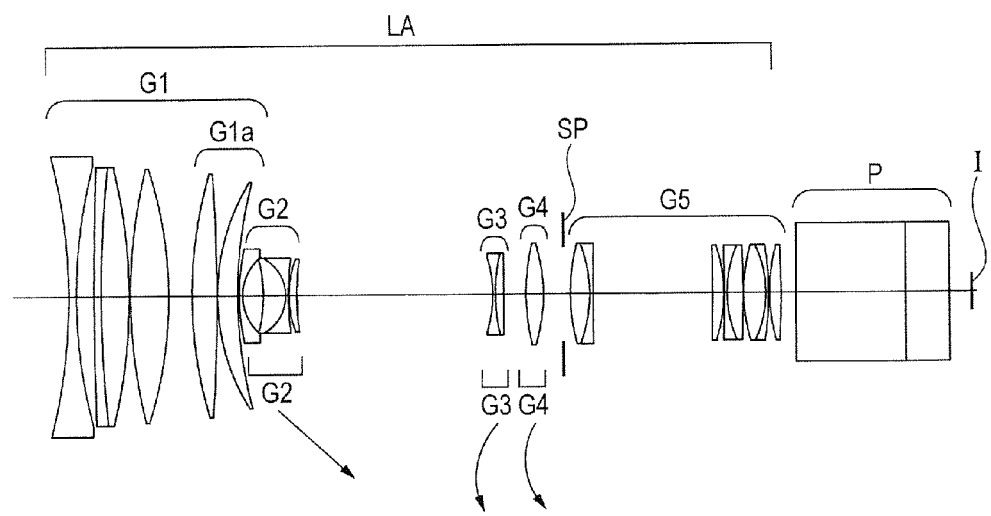
FIG. 4A is a lens cross-sectional view at a wide angle end of a zoom lens of Numerical Example 2.
Figure 4B:
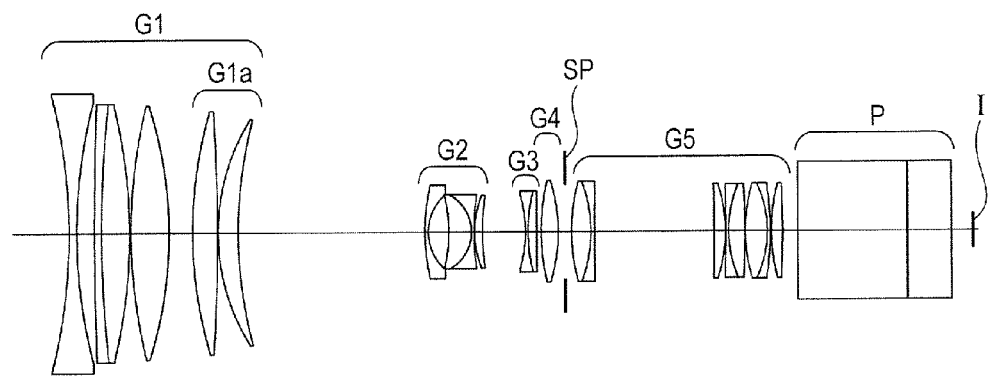
FIG. 4B is a lens cross-sectional view at a telephoto end of the zoom lens of Numerical Example 2.
Figure 5A:
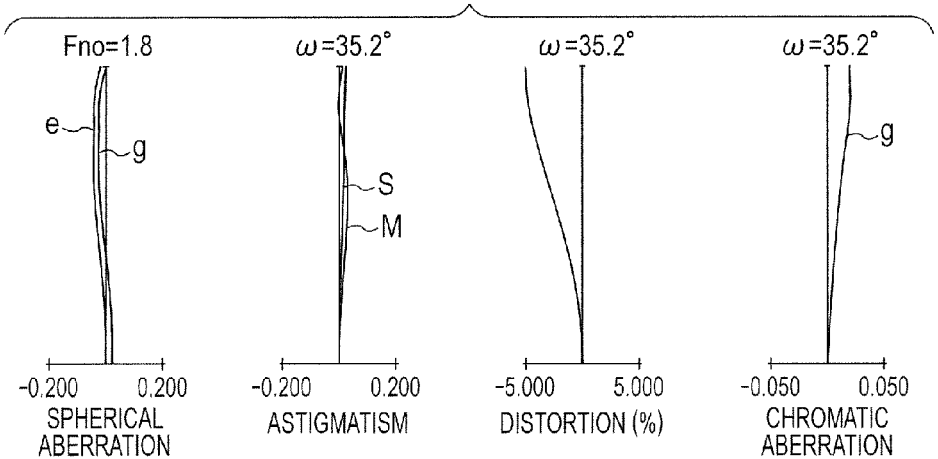
FIG. 5A is a longitudinal aberration diagram at the wide angle end of the zoom lens of Numerical Example 2.
Figure 5B:
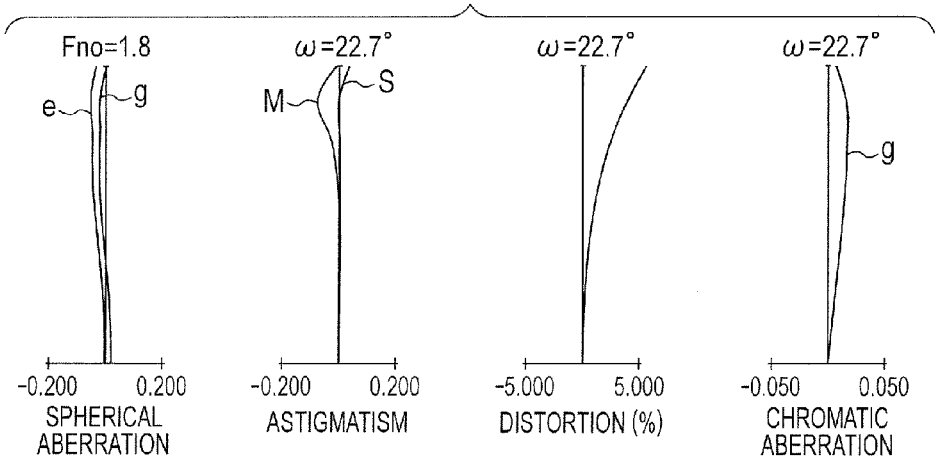
FIG. 5B is a longitudinal aberration diagram at fz=13.13 mm of the zoom lens of Numerical Example 2.
Figure 5C:
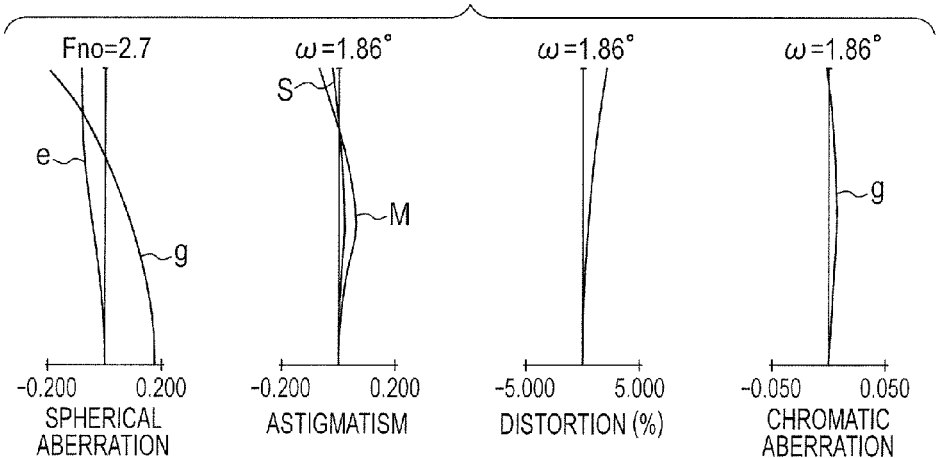
FIG. 5C is a longitudinal aberration diagram at the telephoto end of the zoom lens of Numerical Example 2.
Figure 6A:
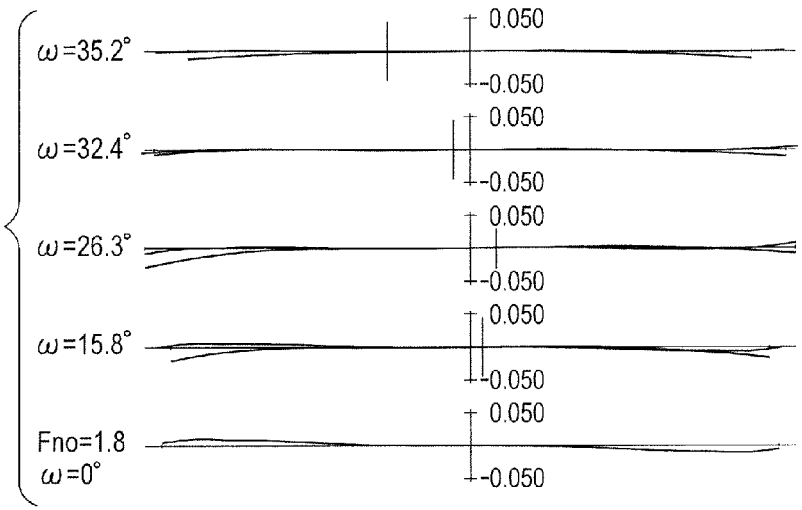
FIG. 6A is a lateral aberration diagram at the wide angle end of the zoom lens of Numerical Example 2.
Figure 6B:
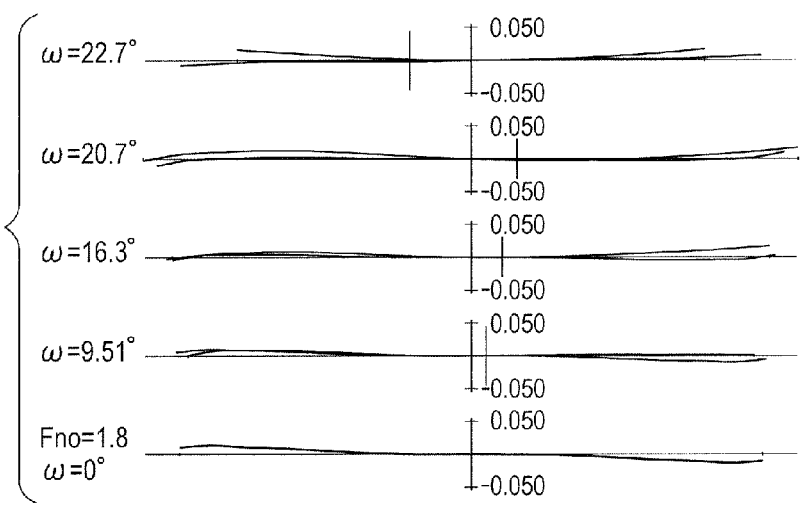
FIG. 6B is a lateral aberration diagram at fz=13.13 mm of the zoom lens of Numerical Example 2.
Figure 6C:
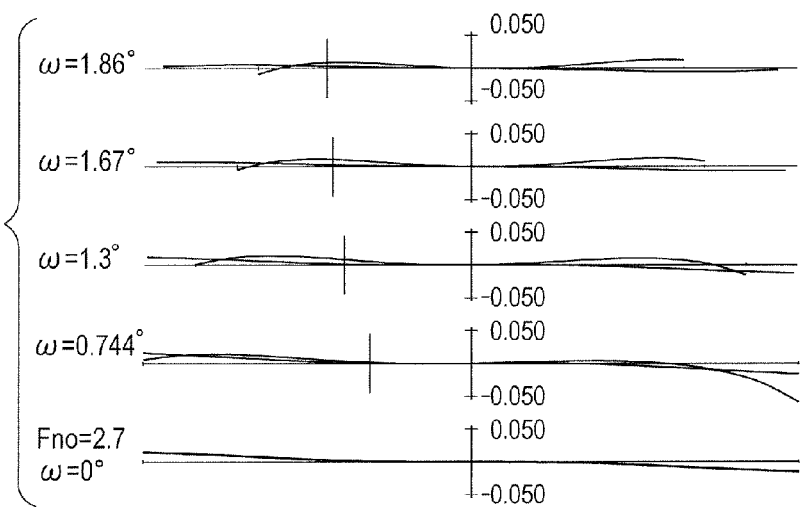
FIG. 6C is a lateral aberration diagram at the telephoto end of the zoom lens of Numerical Example 2.
Figure 7:
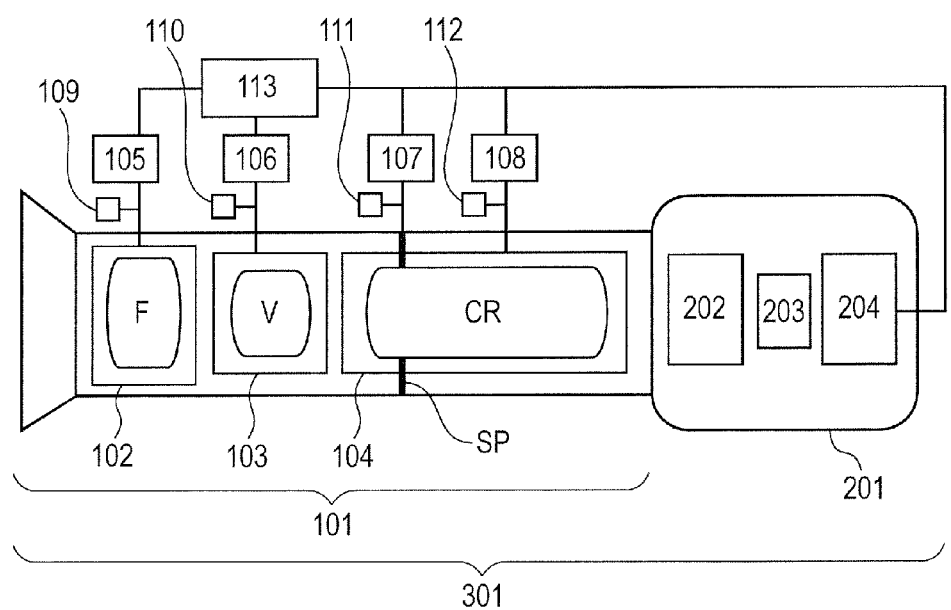
FIG. 7 is a schematic diagram of an image pickup apparatus of the present invention.

FIG. 4A and FIG. 4B are lens cross-sectional views at the wide angle end and the telephoto end when focus is at an object at infinity of the zoom lens of Example 2 (Numerical Example 2) of the present invention, respectively. FIG. 5A, FIG. 5B, and FIG. 5C are longitudinal aberration diagrams at the wide angle end, a focal length of the zoom lens fz=13.13 mm, and the telephoto end when focus is at the object at infinity of Example 2, respectively. FIG. 6A, FIG. 6B, and FIG. 6C are lateral aberration diagrams at the wide angle end, the focal length of the zoom lens fz=13.13 mm, and the telephoto end when focus is at the object at infinity of Example 2, respectively. FIG. 7 is a schematic diagram of an image pickup apparatus of the present invention.

In the lens cross-sectional views of each of Examples, the left side is the object side, and the right side is the image side. The movement loci of the lens units during zooming are indicated by the arrows. In the lens cross-sectional views of each of Examples, a zoom lens LA is illustrated. A first lens unit G1 having a positive refractive power that does not move for zooming, includes a subunit G1a that moves during focusing, as a part thereof.

A second lens unit (variator) G2 having a negative refractive power that moves during zooming, moves monotonously on an optical axis toward the image side during zooming from the wide angle end to the telephoto end. A third lens unit (variator) G3 having a negative refractive power that moves during the zooming, moves on the optical axis along a locus convex toward the object side during the zooming from the wide angle end to the telephoto end. A fourth lens unit (compensator) G4 having a positive refractive power that moves during the zooming, moves non-linearly on the optical axis to correct image plane variation accompanying zooming during the zooming from the wide angle end to the telephoto end.

In each of Examples, the second lens unit G2, the third lens unit G3, and the fourth lens unit G4 construct a zoom system. A fifth lens unit (relay lens unit) G5 having a positive refractive power that does not move for zooming, has an image forming action. A stop (aperture stop) SP is arranged on the object side of the fifth lens unit G5.

A color separation prism, an optical filter, or the like is denoted by P and is illustrated as a glass block in FIG. 1A, FIG. 1B, FIG. 5A, and FIG. 5B. An image plane I corresponds to an image plane of a solid image pickup element (photo-electric conversion element) for receiving light of an image formed by the zoom lens so as to perform photo-electric conversion. In the aberration diagrams, symbols "e" and "g" of spherical aberration represent an e-line and a g-line, respectively. Symbols "M" and "S" of astigmatism represent a meridional image plane and a sagittal image plane, respectively. Lateral chromatic aberration is represented by a g-line. A half angle of field is denoted by co, and an F-number is denoted by Fno. Spherical aberration is shown at a scale of 0.2 mm, astigmatism is shown at a scale of 0.2 mm, distortion is shown at a scale of 5%, and lateral chromatic aberration is shown at a scale of 0.05 mm.

Note that, in the following examples, the wide angle end and the telephoto end mean zoom positions when the lens unit (second lens unit G2) for zooming is positioned at each end of a mechanically movable range on the optical axis. In the zoom lens of each of Examples, the fourth lens unit G4 has a lens surface having an aspherical shape with which the positive refractive power is weakened. With the aspherical shape, the positive refractive power is weakened from a lens center toward a lens peripheral portion. Then, the following conditional expressions are satisfied:

$$0.023 \times f4 - 1.25 < \Delta X10 < 0.023 \times f4 - 1.15; \quad (1)$$

$$0.016 \times f4 - 0.87 < \Delta X9 < 0.016 \times f4 - 0.77; \quad (2)$$

$$0.0068 \times f4 - 0.36 < \Delta X7 < 0.0068 \times f4 - 0.32; \quad (3)$$

$$\Delta X10 < 0; \quad (4)$$

$$\Delta X9 < 0; \quad (5) \text{ and}$$

$$\Delta X7 < 0, \quad (6)$$

where $\Delta X10$, $\Delta X9$, and $\Delta X7$ represent aspherical amounts at 10th, 9th, and 7th out of 10 positions from the lens center of an effective diameter of a lens, respectively, and f4 represents a focal length of the fourth lens unit G4.

Note that, the "aspherical amount" as used herein represents a difference in an optical axis direction between a shape determined by a curvature radius on the optical axis (in an expression expressing an aspherical surface, which is to be described below, a coefficient R as a curvature radius) and an actual shape. On a convex surface, a sign of the aspherical amount is negative in a direction in which the positive refractive power is weakened. When the aspherical amounts exceed the upper limits of the conditional expressions (1), (2), and (3), the aspherical amounts become insufficient, and coma in the periphery of an image plane at the focal length of a zoom position fz at which the fourth lens unit G4 is positioned closest to the object side becomes under corrected. Moreover, when the aspherical amounts fall below the lower limits of the conditional expressions (1), (2), and (3), spherical aberration becomes excessive, and optical performance is reduced over the entire zoom range, especially at a center portion of the image plane.

The conditional expressions (4), (5), and (6) define signs of the aspherical amounts, and indicate that the positive refractive power is weakened from a lens center toward a lens peripheral portion. The aspherical shape is set to satisfy the conditional expressions (4), (5), and (6), with the result that coma in a peripheral portion of the image plane is satisfactorily corrected.

The following conditional expression is satisfied:

$$hb4wm > hb4w > hb4tm \quad (7)$$

where hb4w represents a maximum value of an incident height on the fourth lens unit G4 of a principal ray incident at an image height of the 9th out of 10 position from an image plane center of an effective image plane at the wide angle end, hb4wm represents a maximum value of an incident height on the fourth lens unit G4 of the principal ray incident at the image height of the 9th out of 10 position from the image plane center of the effective image plane at a zoom position fz at which the fourth lens unit G4 is positioned closest to the object side during zooming, and hb4tm represents a maximum value of an incident height on the fourth lens unit G4 of the principal ray incident at the image height of the 9th out of 10 position from the image plane center of the effective image plane at a zoom position fd at which an F-drop in which an F-number of the zoom lens is increased starts.

When the conditional expression (7) is satisfied, and when the fourth lens unit G4, which is closest to the aperture stop SP, is positioned closest to the object side, a beam that affects optical performance in the periphery of the image plane passes closer to the periphery of the lens. In this manner, coma in the periphery of the image plane is satisfactorily corrected. When the conditional expression (7) is not satisfied, the coma in the periphery of the image plane becomes difficult to correct. The following conditional expression is satisfied:

$$0.9 < h4x/h4w < 1.1 \quad (8)$$

where h4w represents a maximum value of an incident height of an axial beam on the fourth lens unit G4 at the wide angle end, and h4x represents a maximum value of an incident height of the axial beam on the fourth lens unit G4 in a zoom range from the wide angle end to the zoom position fd at which the F-drop in which the F-number of the zoom lens is increased starts. When the ratio exceeds the upper limit or falls below the lower limit of the conditional expression (8), the effect of the aspherical surface on spherical aberration over the entire zoom range is changed, and the optical performance at the center portion of the image plane is affected significantly by the zooming, which is disadvantageous.

The above-mentioned configurations are adopted to obtain the zoom lens having a wide angle of field and a high zoom ratio, as well as high optical performance over the entire zoom range. Next, features of Examples are described with reference to the drawings. Example 1 in FIG. 1A and FIG. 1B is described.

In FIG. 1A and FIG. 1B, a zoom lens LA is illustrated. A first lens unit G1 having a positive refractive power does not move for zooming. A subunit G1a, which is a part in the first lens unit G1, moves during focusing. The subunit G1a is extended to the object side to perform focusing from infinity to an object distance of 0.8 m.

A second lens unit (variator) G2 having a negative refractive power for zooming moves on the optical axis toward the image side to perform the zooming from the wide angle end to the telephoto end. A third lens unit G3 having a negative refractive power for zooming moves along a locus convex toward the object side during zooming from the wide angle end to the telephoto end. A fourth lens unit (compensator) G4 having a positive refractive power moves non-linearly on the optical axis in order to correct the image plane variation accompanying the zooming.

More specifically, the fourth lens unit G4 moves toward the object side, then toward the image side, and again toward the object side along a letter S shaped locus as indicated by the arrow during zooming from the wide angle end to the telephoto end. The fourth lens unit G4 includes a single positive lens. The image plane variation accompanying the zooming may be corrected by the third lens unit G3. An aperture stop is denoted by SP. A fifth lens unit (relay unit) G5 having a positive refractive power has an imaging action. In the fifth lens unit G5, an extender for converting the focal length of the zoom lens may be mounted in some cases.

In the zoom lens of this Example, a lens surface of a part of the fourth lens unit G4, which is closest to the aperture stop of the lens units that move during zooming, has an aspherical shape with which the positive refractive power is weakened. In this Example, the fourth lens unit G4 includes one positive lens, and an image side of the positive lens has an aspherical shape. Moreover, the aspherical shape is a shape with which the positive refractive power is weakened from the optical axis toward the periphery of the lens. An optical action of the aspherical surface satisfactorily corrects coma in the periphery of the image plane especially at a zoom position fz=12.5 mm at which the fourth lens unit G4 is positioned closest to the object side during zooming, and maintains good optical performance over the entire zoom range.

In this Example, a focal length f4 of the fourth lens unit G4 is 48.0 mm. Moreover, aspherical amounts (ΔX10, ΔX9, and ΔX7) at the 10th, 9th, and 7th out of 10 positions from the lens center of an effective diameter of the lens are ΔX10=−0.106 mm, ΔX9=−0.070 mm, and ΔX7=−0.024 mm, respectively.

In this Example, the conditional expressions (1) to (6) are satisfied to satisfactorily correct coma and reduce the occurrence of spherical aberration.

The maximum values hb4w, hb4wm, and hb4tm of the incident heights in this Example are 9.5 mm, 14.3 mm, and 3.8 mm, respectively. In other words, the conditional expression (7): hb4wm>hb4w>hb4tm is satisfied.

In this Example, the maximum value h4w of the incident height of the axial beam on the fourth lens unit G4 at the wide angle end is 14.3 mm. Moreover, the maximum value h4x of the incident height of the axial beam on the fourth lens unit G4 in the zoom range from the wide angle end to the zoom position fd at which the F-drop in which the F-number is increased starts is 14.4 mm (focal length: 13.1 mm) at the maximum, and 14.2 mm (focal length: 112.7 mm) at the minimum. In this manner, the maximum value and the minimum value of h4x/h4w in the zoom range from a zoom position at the wide angle end to the zoom position fd are 1.01 and 0.99, respectively, which satisfy the conditional expression (8).

Example 2 in FIG. 4A and FIG. 4B is described. Functions and the like of lens units in this Example are similar to those in Numerical Example 1. During zooming from the wide angle end to the telephoto end, as indicated by the arrows, the second lens unit G2 moves toward the image side, and the third lens unit G3 and the fourth lens unit G4 move along loci convex toward the object side. The fourth lens unit G4 includes a single positive lens.

In this Example, of the positive lens of the fourth lens unit G4, a lens surface on the image side has an aspherical shape. Moreover, the aspherical shape is a shape with which the positive refractive power is weakened from the optical axis toward the periphery of the lens. An optical action of the aspherical surface satisfactorily corrects coma in the periphery of the image plane especially at a zoom position fz=13.13 mm at which the fourth lens unit G4 is positioned closest to the object side during zooming, and maintains good optical performance over the entire zoom range.

In this Example, a focal length f4 of the fourth lens unit G4 is 43.6 mm. Moreover, aspherical amounts (ΔX10, ΔX9, and ΔX7) at the 10th, 9th, and 7th out of 10 positions from the lens center of an effective diameter of the lens are ΔX10=−0.160 mm, ΔX9=−0.100 mm, and ΔX7=−0.034 mm, respectively.

In this Example, the conditional expressions (1) to (6) are satisfied, to thereby satisfactorily correct coma and reduce the occurrence of spherical aberration.

The maximum values hb4w, hb4wm, and hb4tm of the incident heights in this Example are 9.5 mm, 14.3 mm, and 3.8 mm, respectively. In other words, the conditional expression (7): hb4wm>hb4w>hb4tm is satisfied.

In this Example, the maximum value h4w of the incident height of the axial beam on the fourth lens unit G4 at the wide angle end is 14.3 mm. Moreover, the maximum value h4x of the incident height of the axial beam on the fourth lens unit G4 in the zoom range from the wide angle end to the zoom position fd at which the F-drop in which the F-number is increased starts is 14.4 mm (focal length: 13.1 mm) at the maximum, and 14.2 mm (focal length: 112.7 mm) at the minimum. In this manner, the maximum value and the minimum value of h4x/h4w in the zoom range from a zoom position at the wide angle end to the zoom position fd are 1.01 and 0.99, respectively, which satisfy the conditional expression (8).

FIG. 7 is a schematic diagram of a main part of the image pickup apparatus (television camera system) in which the zoom lens of each example of the present invention is used as a photographing optical system. In FIG. 7, the zoom lens according to Example 1 or Example 2 is denoted by 101, and a camera is denoted by 201. The zoom lens 101 can be mounted to and removed from the camera 201. An image pickup apparatus 301 is constructed when the zoom lens 101 is mounted to the camera 201. The zoom lens 101 includes a focus unit F including a lens system for focusing, a zoom unit V including a lens unit for zooming, and a relay unit CR including a lens unit configured to correct the image plane variation accompanying the zooming, and a lens unit for imaging that does not move during focusing.

The relay unit CR may include a lens unit (extender), which is removably insertable in an optical path and configured to displace the focal length of the zoom lens. The relay unit CR may also include an image stabilizing optical system that moves so as to have a component in a vertical direction with respect to the optical axis during image blurring correction. An aperture stop is denoted by SP. Drive mechanisms 102 to 104 such as helicoids or cams drive the lens units included in the focus unit F, the zoom unit V, and the relay unit CR, respectively.

Here, motors 105 to 108 (drive units) electrically drive the drive mechanisms 102 to 104 and the aperture stop SP. Detectors 109 to 112 each include an encoder, a potentiometer, a photosensor, or the like, for detecting a position of the lens units included in the focus unit F, the zoom unit V, and the relay unit CR on the optical axis, a diameter of the aperture stop SP, or the like.

In the camera 201, a glass block 202 corresponds to an optical filter or a color separation optical system, and a solid image pickup element 203 (photo-electric conversion element) such as a CCD sensor or a CMOS sensor receives light of a subject image formed by the zoom lens 101. In addition, CPUs 204 and 113 control various drives of the camera 201 and the zoom lens 101.

In this way, by applying the zoom lens of the present invention to the television camera, the image pickup apparatus having high optical performance is realized. The structure of the zoom lens and the camera according to the present invention is not limited to the form illustrated in FIG. 7, and can be modified and changed variously within the scope of the spirit. Other than that, the zoom lens of the present invention can also be applied to an image pickup apparatus such as a digital camera or a video camera.

Next, Numerical Examples of the present invention are shown below. In each numerical example, i represents the order of a surface from the object side, ri represents a curvature radius of an i-th surface from the object side, di represents an interval between the i-th surface and the (i+1)th surface from the object side, and ndi and vdi respectively represent a refractive index of the d-line and an Abbe constant of an optical member between the i-th surface and the (i+1)th surface. Last three surfaces on the image side are glass blocks, such as a filter. BF represents air-converted back focus, which refers to an equivalent air conversion distance from a final lens surface to an image plane. A total lens length is a value obtained by adding the back focus to a distance from the first lens surface to the final lens surface.

The aspherical shape is expressed by the following expression:

$$X = \frac{H^2/R}{1+\sqrt{1-(1+k)(H/R)^2}} + A4H^4 + A6H^6 + A8H^8 + A10H^{10} + A12H^{12}$$

where X represents a coordinate in the optical axis direction, H represents a coordinate in a direction perpendicular to the optical axis, a traveling direction of light corresponds to a positive direction, R represents a paraxial curvature radius, k represents a conic constant, and A4, A6, A8, A10, and A12 represent aspherical coefficients. Further, "e-Z" means "×10$^{-z}$". Further, correspondence between each example and each conditional expression described above is shown in Table 1.

Numerical Example 1

| | | Unit mm | | |
|---|---|---|---|---|
| | | Surface data | | |
| Surface Number | r | d | nd | vd |
| 1 | −190.007 | 2.30 | 1.72047 | 34.7 |
| 2 | 156.768 | 4.87 | | |
| 3 | 694.892 | 2.20 | 1.84666 | 23.8 |
| 4 | 275.524 | 8.70 | 1.43875 | 94.9 |
| 5 | −179.515 | 0.40 | | |
| 6 | 166.357 | 10.90 | 1.43387 | 95.1 |
| 7 | −137.515 | 7.02 | | |
| 8 | 130.075 | 7.65 | 1.59240 | 68.3 |
| 9 | −477.969 | 0.15 | | |
| 10 | 62.052 | 6.20 | 1.72916 | 54.7 |
| 11 | 125.670 | (Variable) | | |
| 12 | 65.339 | 1.00 | 1.88300 | 40.8 |
| 13 | 14.550 | 6.16 | | |

-continued

Unit mm

| | | | | |
|---|---|---|---|---|
| 14 | −44.448 | 6.77 | 1.80809 | 22.8 |
| 15 | −12.423 | 0.75 | 1.88300 | 40.8 |
| 16 | 88.606 | 0.18 | | |
| 17 | 30.523 | 2.44 | 1.66680 | 33.0 |
| 18 | 92.261 | (Variable) | | |
| 19 | −37.712 | 0.75 | 1.75700 | 47.8 |
| 20 | 67.757 | 2.32 | 1.84649 | 23.9 |
| 21 | −717.851 | (Variable) | | |
| 22 | 93.745 | 4.84 | 1.64000 | 60.1 |
| 23* | −45.035 | (Variable) | | |
| 24 (Stop) | ∞ | 2.00 | | |
| 25 | 57.027 | 5.85 | 1.51742 | 52.4 |
| 26 | −43.946 | 1.00 | 1.83400 | 37.2 |
| 27 | −350.477 | 36.00 | | |
| 28 | −32.968 | 2.49 | 1.51633 | 64.1 |
| 29 | −28.481 | 1.07 | | |
| 30 | 257.953 | 0.80 | 1.80100 | 35.0 |
| 31 | 35.293 | 5.41 | 1.50127 | 56.5 |
| 32 | −111.395 | 0.15 | | |
| 33 | 87.276 | 7.05 | 1.48749 | 70.2 |
| 34 | −24.360 | 0.85 | 1.88300 | 40.8 |
| 35 | −85.479 | 0.29 | | |
| 36 | 63.992 | 4.98 | 1.51633 | 64.1 |
| 37 | −49.586 | 4.50 | | |
| 38 | ∞ | 33.00 | 1.60859 | 46.4 |
| 39 | ∞ | 13.20 | 1.51633 | 64.1 |
| 40 | ∞ | 6.99 | | |
| Image plane | ∞ | | | |

Aspherical data
Twenty-third surface

K = −6.95534e−001   A4 = 1.29096e−006   A6 = 3.74923e−010
A8 = 5.46374e−012   A10 = −1.71339e−014   A12 = 9.53627e−018

Various data
Zoom ratio 21.81

| | | | | | |
|---|---|---|---|---|---|
| Focal length | 7.80 | 12.50 | 25.80 | 114.22 | 170.11 |
| F-number | 1.80 | 1.80 | 1.80 | 1.80 | 2.68 |
| Half angle of field (degree) | 35.19 | 23.75 | 12.03 | 2.76 | 1.85 |
| Image height | 5.50 | 5.50 | 5.50 | 5.50 | 5.50 |
| Total lens length | 272.00 | 272.00 | 272.00 | 272.00 | 272.00 |
| BF | 40.71 | 40.71 | 40.71 | 40.71 | 40.71 |
| d11 | 0.39 | 14.64 | 33.23 | 53.26 | 55.49 |
| d18 | 60.06 | 33.52 | 13.48 | 6.97 | 11.78 |
| d21 | 6.57 | 11.41 | 15.95 | 8.59 | 1.42 |
| d23 | 3.75 | 11.19 | 8.10 | 1.93 | 2.06 |

Zoom lens unit data

| Unit | First surface | Focal length |
|---|---|---|
| 1 | 1 | 71.50 |
| 2 | 12 | −13.80 |
| 3 | 19 | −57.00 |
| 4 | 22 | 48.00 |
| 5 | 25 | 51.71 |

Numerical Example 2

Unit mm

Surface data

| Surface number | r | d | nd | vd |
|---|---|---|---|---|
| 1 | −170.443 | 2.30 | 1.72047 | 34.7 |
| 2 | 153.262 | 5.28 | | |
| 3 | 1004.829 | 2.20 | 1.84666 | 23.8 |

-continued

Unit mm

| | | | | |
|---|---|---|---|---|
| 4 | 356.811 | 8.44 | 1.43875 | 94.9 |
| 5 | −161.473 | 0.40 | | |
| 6 | 159.276 | 11.44 | 1.43387 | 95.1 |
| 7 | −126.268 | 7.03 | | |
| 8 | 128.260 | 7.44 | 1.59240 | 68.3 |
| 9 | −593.780 | 0.15 | | |
| 10 | 64.050 | 6.08 | 1.72916 | 54.7 |
| 11 | 130.917 | (Variable) | | |
| 12 | 63.264 | 1.00 | 1.88300 | 40.8 |
| 13 | 14.945 | 6.20 | | |
| 14 | −46.598 | 6.81 | 1.80809 | 22.8 |
| 15 | −12.673 | 0.75 | 1.88300 | 40.8 |
| 16 | 80.410 | 0.18 | | |
| 17 | 29.776 | 2.34 | 1.66680 | 33.0 |
| 18 | 74.506 | (Variable) | | |
| 19 | −38.098 | 0.75 | 1.75700 | 47.8 |
| 20 | 51.261 | 2.50 | 1.84649 | 23.9 |
| 21 | 17678.609 | (Variable) | | |
| 22 | 65.511 | 5.22 | 1.64000 | 60.1 |
| 23* | −47.440 | (Variable) | | |
| 24 (Stop) | ∞ | 2.00 | | |
| 25 | 56.544 | 5.88 | 1.51742 | 52.4 |
| 26 | −41.757 | 1.00 | 1.83400 | 37.2 |
| 27 | 1320.495 | 36.00 | | |
| 28 | −559.943 | 3.38 | 1.51633 | 64.1 |
| 29 | −45.131 | 0.13 | | |
| 30 | −471.389 | 0.80 | 1.80100 | 35.0 |
| 31 | 35.833 | 4.90 | 1.50127 | 56.5 |
| 32 | −260.827 | 0.15 | | |
| 33 | 51.160 | 6.67 | 1.48749 | 70.2 |
| 34 | −32.939 | 0.85 | 1.88300 | 40.8 |
| 35 | −91.233 | 0.29 | | |
| 36 | 54.868 | 3.41 | 1.51633 | 64.1 |
| 37 | −250.875 | 4.50 | | |
| 38 | ∞ | 33.00 | 1.60859 | 46.4 |
| 39 | ∞ | 13.20 | 1.51633 | 64.1 |
| 40 | ∞ | 7.07 | | |
| Image plane | ∞ | | | |

Aspherical data
Twenty-third surface

K = −7.68287e−001   A4 = 2.36357e−006   A6 = 5.80132e−010
A8 = 1.25835e−011   A10 = −7.28207e−014   A12 = 1.30593e−016

Various data
Zoom ratio 21.72

| | | | | | |
|---|---|---|---|---|---|
| Focal length | 7.80 | 13.13 | 27.82 | 112.69 | 169.41 |
| F-number | 1.80 | 1.80 | 1.80 | 1.80 | 2.70 |
| Half angle of field (degree) | 35.19 | 22.73 | 11.18 | 2.79 | 1.86 |
| Image height | 5.50 | 5.50 | 5.50 | 5.50 | 5.50 |
| Total lens length | 272.07 | 272.07 | 272.07 | 272.07 | 272.07 |
| BF | 40.79 | 40.79 | 40.79 | 40.79 | 40.79 |
| d11 | 0.49 | 15.84 | 34.78 | 53.74 | 56.04 |
| d18 | 59.00 | 31.31 | 11.27 | 7.76 | 12.97 |
| d21 | 6.77 | 11.81 | 16.30 | 8.46 | 1.38 |
| d23 | 6.07 | 13.37 | 9.98 | 2.36 | 1.92 |

Zoom lens unit data

| Unit | First surface | Focal length |
|---|---|---|
| 1 | 1 | 71.50 |
| 2 | 12 | −13.80 |
| 3 | 19 | −55.04 |
| 4 | 22 | 43.61 |
| 5 | 25 | 50.73 |

TABLE 1

| | f4 | ΔX10 | ΔX9 | ΔX7 | hb4w | hb4wm | hb4tm |
|---|---|---|---|---|---|---|---|
| Example 1 | 48.0 mm | −0.106 mm | −0.070 mm | −0.024 mm | 9.2 mm | 14.1 mm | 4.1 mm |
| Example 2 | 43.6 mm | −0.160 mm | −0.100 mm | −0.034 mm | 9.5 mm | 14.3 mm | 3.8 mm |

| | h4w | h4x (maximum) | h4x (minimum) |
|---|---|---|---|
| Example 1 | 14.2 mm | 14.2 mm | 14.0 mm |
| Example 2 | 14.3 mm | 14.4 mm | 14.2 mm |

TABLE 2

| | Conditional expression (1) | | |
|---|---|---|---|
| | f4 × 0.023−1.25 | ΔX10 | f4 × 0.023−1.15 |
| Example 1 | −0.146 | −0.106 | −0.046 |
| Example 2 | −0.247 | −0.160 | −0.147 |
| | Conditional expression (2) | | |
| | f4 × 0.016−0.87 | ΔX9 | f4 × 0.016−0.77 |
| Example 1 | −0.102 | −0.070 | −0.002 |
| Example 2 | −0.172 | −0.100 | −0.072 |
| | Conditional expression (3) | | |
| | f4 × 0.0068−0.36 | ΔX7 | f4 × 0.0068−0.32 |
| Example 1 | −0.034 | −0.024 | 0.006 |
| Example 2 | −0.064 | −0.034 | −0.024 |
| | Conditional expression (8) | | |
| | h4x/h4w (maximum) | | h4x/h4w (minimum) |
| Example 1 | 1.00 | | 0.99 |
| Example 2 | 1.01 | | 0.99 |

According to the present invention, there is provided a zoom lens having a wide angle of field and a high zoom ratio as well as high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-148612, filed Jul. 22, 2014, which is hereby incorporated by reference herein in its entirety.

What is claimed is:

1. A zoom lens, comprising, in order from an object side to an image side:
    a first lens unit having a positive refractive power that does not move for zooming;
    a second lens unit having a negative refractive power that moves during zooming;
    a third lens unit having a negative refractive power that moves along a locus convex toward the object side during zooming from a wide angle end to a telephoto end;
    a fourth lens unit having a positive refractive power that moves during zooming;
    an aperture stop; and
    a fifth lens unit having a positive refractive power that does not move for zooming,
    wherein the fourth lens unit has a lens surface having an aspherical shape with which the positive refractive power is weakened.

2. A zoom lens according to claim 1, wherein, with the aspherical shape, the positive refractive power is weakened from a lens center toward a lens peripheral portion, and the following conditional expressions are satisfied:

$$0.023 \times f4 - 1.25 < \Delta X10 < 0.023 \times f4 - 1.15;$$

$$0.016 \times f4 - 0.87 < \Delta X9 < 0.016 \times f4 - 0.77;$$

$$0.0068 \times f4 - 0.36 < \Delta X7 < 0.0068 \times f4 - 0.32;$$

$$\Delta X10 < 0;$$

$$\Delta X9 < 0; \text{ and}$$

$$\Delta X7 < 0,$$

where $\Delta X10$, $\Delta X9$, and $\Delta X7$ represent aspherical amounts at 10th, 9th, and 7th out of 10 positions from the lens center of an effective diameter of a lens, respectively, and f4 represents a focal length of the fourth lens unit.

3. A zoom lens according to claim 1, wherein the following conditional expression is satisfied:

$$hb4wm > hb4w > hb4tm,$$

where hb4w represents a maximum value of an incident height on the fourth lens unit of a principal ray incident at an image height of a 9th out of 10 position from an image plane center of an effective image plane at the wide angle end, hb4wm represents a maximum value of an incident height on the fourth lens unit of the principal ray incident at the image height of the 9th out of 10 position from the image plane center of the effective image plane at a zoom position at which the fourth lens unit is positioned at an end on the object side during zooming, and hb4tm represents a maximum value of an incident height on the fourth lens unit of the principal ray incident at the image height of the 9th out of 10 position from the image plane center of the effective image plane at a zoom position at which an F-drop in which an F-number of the zoom lens is increased starts.

4. A zoom lens according to claim 1, wherein the following conditional expression is satisfied:

$$0.9 < h4x/h4w < 1.1,$$

where h4w represents a maximum value of an incident height of an axial beam on the fourth lens unit at the wide angle end, and h4x represents a maximum value of an incident height of the axial beam on the fourth lens unit in a zoom range from the wide angle end to a zoom position at which an F-drop in which an F-number of the zoom lens is increased starts.

5. A zoom lens according to claim 1, wherein the fourth lens unit comprises a single positive lens.

6. A zoom lens according to claim 1, wherein the first lens unit comprises a subunit that moves during focusing, as a part of the first lens unit.

7. An image pickup apparatus, comprising:
the zoom lens of claim 1; and
a solid image pickup element for receiving light of an image formed by the zoom lens.

* * * * *